(12) United States Patent
Kotian

(10) Patent No.: US 9,836,297 B2
(45) Date of Patent: Dec. 5, 2017

(54) COMPUTER IMPLEMENTED METHOD AND SYSTEM FOR AUTOMATICALLY DEPLOYING AND VERSIONING SCRIPTS IN A COMPUTING ENVIRONMENT

(71) Applicant: Tata Consultancy Services Limited, Mumbai (IN)

(72) Inventor: Tejas Kotian, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 7 days.

(21) Appl. No.: 14/832,470

(22) Filed: Aug. 21, 2015

(65) Prior Publication Data
US 2017/0052776 A1    Feb. 23, 2017

(51) Int. Cl.
| | |
|---|---|
| H04L 29/06 | (2006.01) |
| G06F 9/445 | (2006.01) |
| G06F 9/44 | (2006.01) |
| H04L 29/08 | (2006.01) |
| G06F 21/12 | (2013.01) |

(52) U.S. Cl.
CPC .............. *G06F 8/65* (2013.01); *G06F 8/71* (2013.01); *G06F 21/12* (2013.01); *H04L 67/34* (2013.01)

(58) Field of Classification Search
CPC ....................................... H04L 63/08
USPC ............................................. 726/4
See application file for complete search history.

(56) References Cited

U.S. PATENT DOCUMENTS

| | | | |
|---|---|---|---|
| 5,519,859 A | 5/1996 | Grace | |
| 6,243,862 B1* | 6/2001 | Lebow | G06F 9/466 702/119 |
| 7,421,458 B1 | 9/2008 | Taylor et al. | |
| 7,581,207 B2* | 8/2009 | Bolder | H04L 41/0826 714/738 |
| 8,615,526 B2 | 12/2013 | Sinha et al. | |
| 8,712,790 B1* | 4/2014 | Brown | G06F 19/3418 705/2 |
| 8,959,577 B2* | 2/2015 | Epstein | G06F 21/604 713/189 |
| 2012/0229048 A1* | 9/2012 | Archer | H05B 37/0245 315/297 |

\* cited by examiner

*Primary Examiner* — Longbit Chai
(74) *Attorney, Agent, or Firm* — Schwegman Lundberg & Woessner, P.A.

(57) ABSTRACT

Embodiments herein describe computer implemented methods and systems for automatically deploying and versioning scripts in a computing environment. One embodiment includes validating a plurality of scripts associated with an application stored in a repository server by executing the plurality of scripts in a first database, creating at least one patch file comprising at least one of the plurality of scripts upon successful validation of the plurality of scripts associated with the application, and automatically storing the at least one patch file in the repository server, where the at least one of the plurality of scripts are automatically versioned in the repository server. Further embodiments herein enable the plurality of users to track patch files by automatically storing the plurality of scripts with updated comments from the plurality of users. Further, a notification mechanism for alerting the plurality of authorized users about the change to the plurality of scripts is provided.

19 Claims, 5 Drawing Sheets

COMPUTER IMPLEMENTED METHOD AND SYSTEM FOR AUTOMATICALLY DEPLOYING AND VERSIONING SCRIPTS IN A COMPUTING ENVIRONMENT

TECHNICAL FIELD

The embodiments herein generally relate to computer system software applications, and, more particularly, to a computer implemented method and system for automatically deploying and versioning scripts in a computing environment.

BACKGROUND

In computer programming, a script is a program or sequence of instructions that is interpreted or carried out by another program rather than by the computer processor (as a compiled program is). The scripts in a version control system are not connected to database objects and hence these are represented as two separate systems. Coding and testing of a database code is done at a database side, disconnected from any of the coding best practices (check-in, check-out, and labels), and prone to all illnesses of the 'old days'. Examples of such illness of the 'old days' include:

Code-overrides in a database;
No mechanisms to retrieve the scripts from the version control system before starting the database code on the database in order to prevent working on a wrong version;
Manual intervention for looping back the scripts to the version control system;
Failure to detect and track out of process updates;
Manually writing all changes for the scripts thereby requiring the users to track information about applied scripts manually;
Failure to achieve rollbacks unless rollback scripts are written manually; and
Manual transaction management, which can easily leave the database in an inconsistent state.

Typically, an application deployment tool is used to deploy (i.e., install/uninstall) application packages to servers in a computing environment. These deployment tools generally require that the applications for deployment are packaged in a format supported by the deployment tool. The deployment tool then manages the association of the package-to-application and application-to-server. These application "packages" are generally a compilation of the application, its supporting files, and metadata that describes the package and the files therein. As developers package the applications, they generally end up making modifications to the files. However, in order to incorporate the changes, the package must be completely rebuilt even though some of the files may not have changed. Accordingly, the packaging of an application developed by developers may take up enormous amount of storage space with most of the space being taken up by unnecessary redundant files, thereby wasting storage space. Moreover, during deployment and install/reinstallation procedures, all of the files in the application package are uploaded in a server even though only a few files in the application package have changed. Hence, the process involves manual efforts in tracking and managing the files in the application. Furthermore, typical deployment tools rely on package databases having to be local to each server to store the data on which the packages have been installed.

Further, the applications are typically developed with a multi-tier architecture in which functions such as presentation, application processing, and data management are logically separate components. For example, an enterprise's custom banking application that has a multi-tier architecture may use a cluster of application servers (e.g., JBoss Application Servers) to execute in a scalable runtime environment, a relational database management system (e.g., MySQL) to store account data, and a load balancer to distribute network traffic for robustness. To deploy such a multi-tier application, a developer, who understands the architecture of the application, must coordinate with a system administrator, who controls access to computing resources, to determine which computing resources (e.g., computing, networking, and storage) and software services (e.g., software packages) should be provisioned to support execution of the application. However, the developers and the system administrators typically view an application differently. The developers see the application as a group of components with interdependencies, while the system administrators view the application as a series of "runbook" steps to be followed for deployment. As such, there are challenges for the developers and the system administrators to collaborate on determining deployment requirements for the application.

There are various processes followed by the database administrators (DBAs) to deploy the scripts, for example, SQL scripts or versioning but each of the steps involves manual efforts. There are certain solutions which are installed on the database as an add-on or product to be installed on a server studio, thus providing access to an individual with respect to the database objects. This results in exposing the database to multiple users. Further, the developers working on visual studio and the servers, for example, SQL server need to switch between the versions controls for any changes with respect to the database objects. Additionally, the scripts are not validated for the changes. Further, the tool does not show what the syntax error with respect to the scripts is. Also, a huge amount of manual effort is involved to share or package these scripts.

Thus the existing systems fail to provide optimized and effective mechanisms to use the scripts based on the best practices in the IT market.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a computer implemented method and system for automatically deploying and versioning scripts in a computing environment.

In one aspect, a computer implemented method for automatically deploying and versioning scripts is provided. The method comprising validating a plurality of scripts associated with an application stored in a repository server by executing the plurality of scripts in a first database, creating at least one patch file comprising at least one of the plurality of scripts upon successful validation of the plurality of scripts associated with the application, and automatically storing the at least one patch file in the repository server, wherein the at least one of the plurality of scripts comprised in the at least one patch file are automatically versioned in the repository server.

In another aspect, the computer implemented method for automatically deploying and versioning the scripts further comprises storing the plurality of scripts comprised in the at least one patch file in a memory upon successful validation of the plurality of scripts; and sending a notification message to a plurality of authorized users through a communication medium, wherein the notification message comprises at least one of the memory accessible to the plurality of authorized users, validation information associated with the plurality of scripts, a specific sequence of execution of the plurality of scripts, release month and release year.

In another aspect, the computer implemented method for automatically deploying and versioning scripts further comprises creating a guidebook for each application stored in the repository server, wherein the guidebook comprises the log file, and periodically updating the guidebook in the repository server and in the memory when the user modifies a patch file associated with the each application.

In another aspect, a computer implemented system for automatically deploying and versioning scripts is provided. The system comprising a processor, and a memory coupled to the processor, wherein the memory comprises a set of instructions stored in the form of executable program which when executed by the processor, cause the processor to validate a plurality of scripts associated with an application stored in a repository server by executing the plurality of scripts in a first database, create at least one patch file comprising at least one of the plurality of scripts upon successful validation of the plurality of scripts associated with the application, and automatically store the at least one patch file in the repository server, wherein the at least one of the plurality of scripts comprised in the at least one patch file are automatically versioned in the repository server.

In another aspect, the computer implemented system for automatically deploying and versioning scripts, wherein the executable program which when executed by the processor, cause the processor to store the plurality of scripts comprised in the at least one patch file in the memory upon successful validation of the plurality of scripts; and send a notification message to a plurality of authorized users through a communication medium, wherein the notification message comprises at least one of the memory accessible to the plurality of authorized users, validation information associated with the plurality of scripts, a specific sequence of execution of the plurality of scripts, release month and release year.

In another aspect, the computer implemented system, wherein the executable program which when executed by the processor, cause the processor to create a guidebook for each application stored in the repository server, wherein the guidebook comprises the log file, and periodically update the guidebook in the repository server and in the memory when the user modifies a patch file associated with the each application.

In yet another aspect, a non-transitory computer-readable storage medium having instructions stored therein for automatically deploying and versioning scripts is provided. The instructions stored therein that when executed by a processor, cause the processor to perform method steps comprising validating a plurality of scripts associated with an application stored in a repository server by executing the plurality of scripts in a first database, creating at least one patch file comprising at least one of the plurality of scripts upon successful validation of the plurality of scripts associated with the application, and automatically storing the at least one patch file in the repository server, wherein the at least one of the plurality of scripts comprised in the at least one patch file are automatically versioned in the repository server. Further, the storage medium instructions stored therein that when executed by a processor, cause the processor to store the plurality of scripts comprised in the at least one patch file in a memory upon successful validation of the plurality of scripts, and send a notification message to a plurality of authorized users through a communication medium, wherein the notification message comprises at least one of the memory accessible to the plurality of authorized users, validation information associated with the plurality of scripts, a specific sequence of execution of the plurality of scripts, release month and release year. Furthermore, in validating the plurality of scripts associated with the application by executing the plurality of scripts in the first database, the storage medium instructions cause the processor to retrieve the plurality of scripts associated with the application from the repository server based on a user selection; and merge the plurality of scripts associated with the application to create the at least one patch file. Additionally, in retrieving the plurality of scripts associated with the application from the repository server based on the user selection, the storage medium instructions cause the processor to authenticate a user using the repository server based on user credentials, wherein the user credentials are inputted by the user on an user interface, and configure a set of parameters corresponding to the application in a second database based on the authentication, wherein the set of parameters comprises at least one of release configuration, name of the first database, connection string, email ID of the user and an application identifier.

It will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

Figure 1:
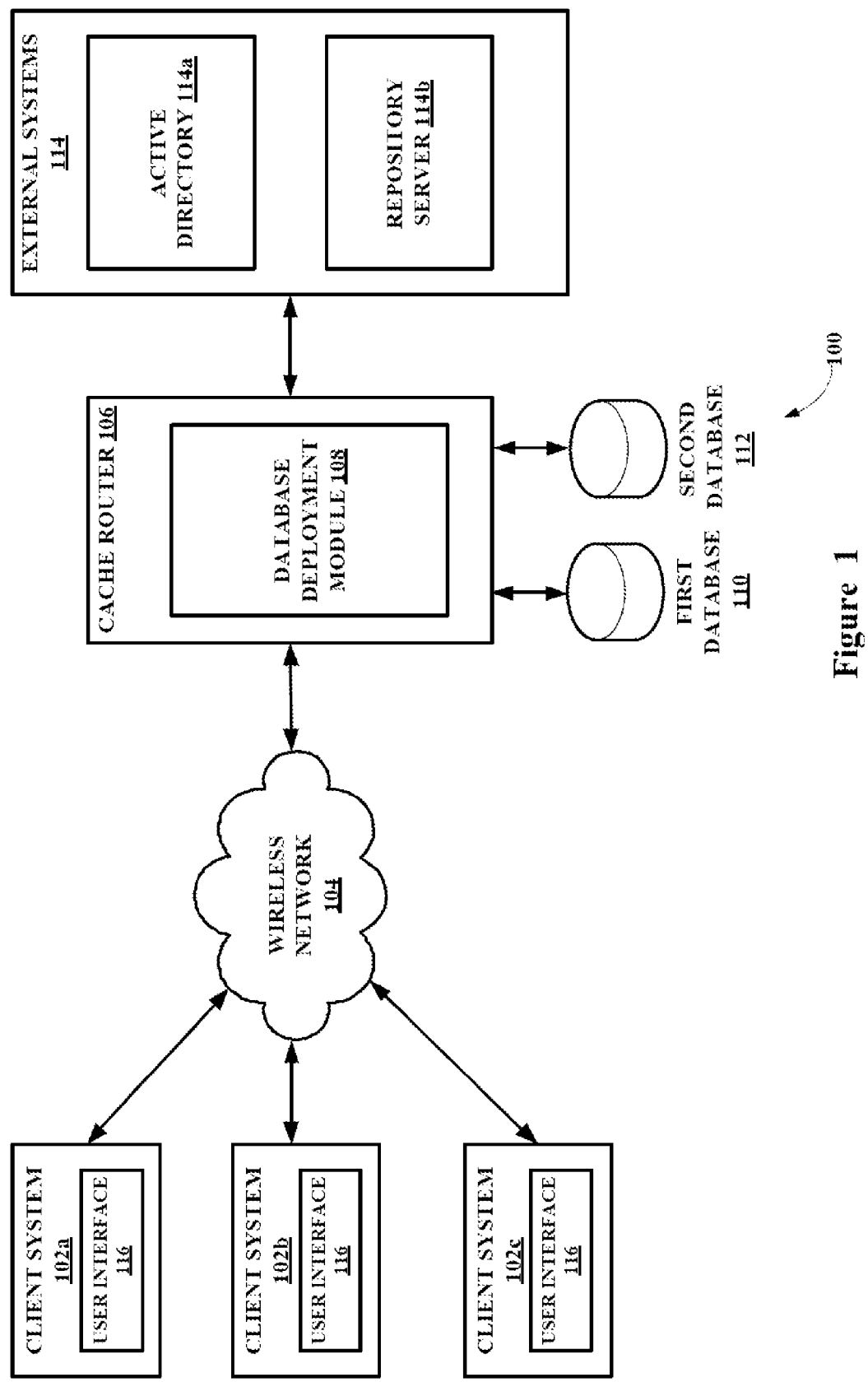
FIG. 1 illustrates a block diagram of a computer implemented system for deploying and versioning scripts, according to an embodiment of the present disclosure.

The specification includes Annexure A which provides actual program fragments which provide examples of various aspects of the described embodiments.

REFERENCE TO ANNEXES

Although the specification provides a complete and detailed description of the several embodiments, the specification does includes Annexure A which provide exemplary actual program or code fragments which provide examples of various aspects of the described embodiments.

It will be appreciated in light of the description provided here that the categorization of the Annexures as well as the use of other headings and subheadings in this description is intended as an aid to the reader and is not to be used to limit the scope of this disclosure or the scope of the appended claims in any way.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein describe a computer implemented method and a system for automatically deploying and versioning scripts in a computing environment. The method includes validating a plurality of scripts associated with an application stored in a repository server by executing the plurality of scripts in a first database, creating at least one patch file comprising at least one of the plurality of scripts upon successful validation of the plurality of scripts associated with the application, and automatically storing the at least one patch file in the repository server, wherein the at least one of the plurality of scripts comprised in the at least one patch file are automatically versioned in the repository server.

According to an embodiment described herein, the present disclosure provides a controlled versioning mechanism for maintaining the scripts. Further, the embodiments herein provide a process to test the scripts based on a project release. Further, the present disclosure provides a simple and efficient mechanism to receive and send patch files to a plurality of users, for example, database administrators (DBAs) and hence enables the plurality of users to manage rules for creation of the patch files.

According to an embodiment described herein, a web-based database deployment platform for automatically generating the plurality of scripts and executing the plurality of scripts in a respective database is provided. For example, the plurality of scripts may correspond to a structured query language (SQL) scripts. Some examples of SQL scripts are provided in Annexure A.

According to embodiments described herein, the database deployment platform further enables the plurality of users to generate the plurality of SQL scripts and execute the plurality of SQL scripts in a respective SQL database.

According to embodiments described herein, the database deployment platform enables the plurality of users to track the patch files individually by automatically storing the plurality of scripts with updated comments from the plurality of users. The database deployment platform may be, for example, a web portal, with authentication and authorization based mechanisms. The database deployment platform further automatically versions and deploys the plurality of scripts based on a specific release cycle pertaining to the application.

According to embodiments described herein, the database deployment platform automatically versions the plurality of scripts, merges the plurality of scripts to create at least one patch file for each deployment. Further, the database deployment platform automatically stores the plurality of scripts in the repository server with the updated comments for tracking the patch files individually. The database deployment platform also manages and tracks sequence of steps through a log file, which provides simple steps for a plurality of authorized users to execute the plurality of scripts.

The database deployment platform further executes the plurality of scripts in a first database, which is a replica database of a main database in order to validate each of the plurality of scripts. This results in identifying a plurality of syntax errors associated with each of the plurality of scripts. However, the conventional systems which generate the scripts failed to validate the plurality of scripts by executing the plurality of scripts in the first database. Due to this, the conventional systems failed to identify the plurality of syntax errors associated with each of the plurality of scripts.

Unlike conventional systems, the database deployment platform provides notification mechanisms for alerting the plurality of authorized users when the patch files are generated and automatically versioned in the repository server with the updated comments from the plurality of users. The notification mechanism involve providing details for executing the plurality of scripts along with a memory accessible to the plurality of authorized users. The memory corresponds to a shared path where the plurality of scripts are created. This eliminates the need of manual intervention in the existing systems and thus provides an automated mechanism for notifying and sharing the plurality of scripts with the plurality of authorized users.

According to yet another embodiment described herein, the database deployment platform provides an interactive user interface for configuring all the scripts associated with the application along with a database connection string and an email configuration.

Unlike conventional systems, the database deployment platform does not require a pre-knowledge of script concepts. Therefore, the database deployment platform provides seamless integration with other projects.

According to yet another embodiment described herein, the database deployment platform provides the ability to associate each change in the scripts with each story or business requirement, such that the story can be promoted from one deployment environment to the next and the appropriate change in the scripts are selected and packaged as part of the deployments. The database deployment platform merges all the scripts in a single patch file, thus when the merged single patch file is provided to a database administrator (DBA) for integration in production, the single patch file is easily accessible in shared folder and ftp location for access to the DBA. The database deployment platform is a web portal, which enables the DBA or application owner to select the scripts from a repository server where all the scripts are stored and categorize those scripts based on a release and whether they are stored procedure, table scripts or functions and additionally enable to arrange the selected scripts in a sequence. Thus, application user or the DBA has a controlled sequencing ability in addition to viewing scripts developed and stored by other users. Thus once satisfied with the list of scripts for that particular release, the application user or the DBA merges all the scripts into one patch file for easy manageability and maintainability through the database deployment platform. Each business requirement and release phases are distributed in such files and versioned with help of repository server (described later) through the database deployment platform along with appropriate release comments.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 illustrates a block diagram of a computer implemented system 100 for deploying and versioning the scripts, according to an embodiment of the present disclosure. The computer implemented system 100 includes a plurality of client systems 102a, 102b and 102c, a cache router 106, a first database 110 and a second database 112 communicatively coupled to the cache router 106 and external systems 114 communicatively coupled to the cache router 106. The cache router 106 further includes a database deployment module 108 comprising a set of instructions which when executed on a processor, cause the processor to automatically deploy and version the scripts. Further, the external systems 114 includes a plurality of third party entities, such as those, but are not limited to, an active directory 114a, a repository server 114b, and so on. The plurality of client systems 102a, 102b and 102c are connected to the cache router 106 via a wireless network 104. The plurality of client systems 102a, 102b and 102c includes a user interface 116 for providing an interaction between users of the plurality of client systems 102a, 102b and 102c and the cache router 106.

Examples of well-known computer implemented systems, environments, and configurations suitable for use with the embodiments described herein include, but are not limited to, mobile telephones, personal computers, servers, multiprocessor systems, microprocessor-based systems, minicomputers, mainframe computers, and distributed computing environments that include any of the above systems or devices.

The plurality of client systems 102a, 102b and 102c may be a personal computer, a mainframe computer, a server, a mobile phone, a laptop and the like and can communicate across the wireless network 104 for deploying and versioning the scripts. Each of the plurality of client systems 102a, 102b and 102c interact with the cache router 106 for deploying the plurality of scripts via the user interface 116. The user interface 116 on each of the plurality of client systems 102a, 102b and 102c, enables the users to input a set of parameters, associated with an application stored in the repository server 114b, during a process of deployment. The set of parameters includes at least one of a release configuration, name of the first database, a connection string, an email identifier (ID) of the user and an application identifier. The user interface 116 is further configured for displaying a plurality of notification messages associated with the users. The notification messages associated with the users may include, but not limited to, a validation information associated with the plurality of scripts, a specific sequence of execution of the plurality of scripts, release month, release year, a database memory usage and syntax error notifications. Further, the database deployment module 108 provides notification in three mechanisms. Firstly, when all the scripts for release are created into a single patch file successfully, the database deployment module 108 stores all the patch files in the repository server 114b and in guide book in an FTP location. The guide book is the set of instructions which he or she needs to execute in the first database 110 along with the patch files in script location. Secondly, if the script deployment process is successful, then the database deployment module 108 sends an email to specific application users which are configured in the database deployment platform-Dashboard configurations with DBA instruction and patch files attached in the email. Thirdly, user interface 116 provides with success dialog which has the path to patch location accessible to the plurality of client systems 102a, 102b and 102c along with the database administration instructions as a guide book. If there are any failures in the patch creation, the database deployment module 108 displays errors with details script execution failures and errors on the user interface 116. The notifications are not just restricted with errors and success, the database deployment module 108 also displays during the script selection for patch files who has created the script and, thus providing detailed information of the script at the ease. Furthermore, the user interface 116 is configured for obtaining user credentials associated with the user during authentication process of the user. In an exemplary embodiment, the user credentials may include an email identifier (ID) associated with the user, a password, and other personal information relating to the user. However, it is to be understood by a person skilled the art that the user credentials mentioned above are not limited to those disclosed herein and may include any further parameters known in the art.

The wireless network 104 may include, for example, an IEEE 802.16 Wireless Metropolitan Area Network (Wi-MAX), an IEEE 802.11 Wireless Local Area Network (WLAN), or a cellular telephone network, according to example embodiments. Examples of such wireless networks may include WiFi®, Bluetooth®, and 3G. In some examples, the cache router 106 may utilize the network interface (not shown) to wirelessly communicate with the external systems 114.

The cache router 106 may be any electronic device capable of automatically deploying and versioning the scripts. For example, the cache router 106 may be, but not limited to, a server, personal computers, multiprocessor systems, microprocessor-based systems, minicomputers, and mainframe computers. The cache router 106 is communicatively coupled to the first database 110, the second database 112, the active directory 114a and the repository server 114b of the external systems 114 and to the plurality of client systems 102a, 102b and 102c. The cache router 106 further includes the database deployment module 108 which includes the set of instructions which when executed on a processor (not shown in FIG. 1), causes the processor to automatically deploy and version the scripts. In an embodiment of the present disclosure, the database deployment module 108 causes the processor to validate the plurality of scripts associated with the application stored in the repository server 114b by executing the plurality of scripts in the first database 110, create at least one patch file comprising at least one of the plurality of scripts upon successful validation of the plurality of scripts associated with the application and automatically store the at least one patch file in the repository server 114b, where the at least one of the plurality of scripts comprised in the at least one patch file are automatically versioned in the repository server 114b. Some examples of patch files are provided in Annexure A.

The first database 110 corresponds to a test database of the computer implement system 100 for automatically deploying and versioning the scripts, where the test database is the replica of a main database. For example, during the configuration of the set of parameters, the user selects one among a plurality of databases as the main database and creates a replica of the main database to act as the test database. For example, the user can select an SQL database to be the main database and creates a replica of the SQL database to act as the test database. In an embodiment, the user can alternatively change the test database during a validation process of the plurality of scripts and select an alternate database to act as the test database. In such a scenario, the test database and the main database selected by the user are different. The main database includes all the scripts associated with plurality of applications developed (e.g., developed by the users). The first database 110 is configured for executing the plurality of scripts in order to validate the plurality of scripts. The first database 110, in communication with the catch router 106, validates the plurality of scripts by identifying the plurality of syntax errors associated with the plurality of scripts during the execution of the plurality of scripts. Further, the first database 110 is configured for sending the validation results to the cache router 106 upon executing the plurality of scripts. The validation results include either a success message or a failure message.

The second database 112 is configured for storing the set of parameters corresponding to the each application, where the set of parameters are obtained by the user during configuration process. The set of parameters are obtained by the user upon successful authentication of the user to access the database deployment platform. All records relating to the set of parameters are stored in a specific format, for example, a Binary JavaScript Object Notation (BSON) format. The BSON format compresses the size of the record and hence increases the storage capacity. An example of the second database 112 may include, an open source document database (e.g., a mongo database). However, it is to be understood by a person skilled in the art that the second database 112 is not limited to those mentioned above and can include any database known in the art suitable for the implementations disclosed herein.

The external systems 114 provide external support to the cache router 106 for deploying and versioning the scripts. The external systems 114 are referred to as "external" because the external systems 114 are external to the cache router 106. The cache router 106 and the external systems 114 may be communicatively coupled via a network (not shown). Examples of the external systems 114 may include, but are not limited to, Structured Query Language ("SQL") database servers, relational database management systems ("RDMSs"), customer relationship management ("CRM") systems, enterprise resource planning ("ERP") systems, business intelligence ("BI") systems, web services, custom applications, and the like. Each of the external systems 114 may provide one or more different types of the external data depending on the particular external systems 114. Further, some of the external data between the external systems 114 may or may not overlap.

The active directory 114a presents organizations with a directory service designed for distributed computing environments. The active directory 114a allows organizations to centrally manage and share information on network resources and users while acting as the central authority for network security. In addition, the active directory 114a is designed to be a consolidation point for isolating, migrating, centrally managing, and reducing the number of directories that companies require. The active directory 114a, may include, such as, for example, a Windows® active directory. The active directory 114a may include one or more active directory objects and may be stored within a database or any other suitable medium.

The repository server 114b in communication with the catch router 106 is configured for authenticating the user based on the user credentials when the user logs into the database deployment platform. The repository server 114b stores the plurality of scripts associated with the plurality of applications developed by the users prior to initiating the deployment process. The plurality of scripts stored in the repository server 114b are further used for deploying the application in various deployment scenarios. In an embodiment, the repository server 114b obtains the plurality of scripts associated with the each application from the plurality of users, in which each of the plurality of scripts are developed by the plurality of users before deploying the plurality of scripts. Hence, when the user logs into the database deployment platform and is authenticated by the cache router 106 using the repository server 114b, the cache router 106 triggers a message to the user, the message comprising a request to provide the set of parameters associated with the application for configuration in the second database 112. The set of parameters associated with the application are then obtained from the user in response to the message sent by the cache router 106. Upon configuring the set of parameters in the second database 112, the cache router 106 receives a request for retrieving the plurality of scripts from the user, based on which the plurality of scripts associated with that application are retrieved from the repository server 114b. Further, the cache router 106 may either retrieve the plurality of scripts developed by the logged in user for that application or may retrieve the plurality of scripts developed by other users for the same application based on the received request.

According to an embodiment described herein, the repository server 114b automatically stores the at least one patch file comprising the plurality of scripts upon successful validation of the plurality of scripts in the first database 110. Each time a script associated with the application is modified, updated or erased from the application, the repository server 114b maintains latest version of the script associated with the application. Also, the repository server 114b updates the cache router 106 regarding the change in the script and hence initiates to send the notification message to a plurality of authorized users indicating the change.

According to an embodiment described herein, the repository server 114b maintains separate folders containing the plurality of scripts for the each application. Alternatively, the repository server 114b maintains the separate folders based on the users who developed the application.

According to an embodiment described herein, the repository server 114b automatically stores the at least one patch file along with at least one comment/suggestion (or any similar input) provided by the user for tracking the changes to the plurality of scripts. In an exemplary embodiment, the repository server 114b may correspond to a Team Foundation Server (TFS). However, it is to be understood by a person skilled in the art that the repository server 114b is not limited to those mentioned above and can include any servers known in the art suitable for the implementations disclosed herein.

According to an embodiment described herein, the user logs into the database deployment platform on, say a client system 102a, via the user interface 116 by providing the user credentials. The database deployment module 108 authenticates the user using the repository server 114b based on the user credentials. Upon authenticating the user, the user inputs the set of parameters to be configured onto the second database 112. In an exemplary embodiment, the set of parameters includes:

1) Obtain Application Name

2) Obtain Alias Name for the application which would be used to refer in guide books which would be generated by the database deployment module 108. Further, alias name would be used to prefix the patch name for example, application and alias name is trading, then the patch file would be Trading_Nov_2015_1.sql file.

3) Obtain Application user needs to provide for which release year and release month this configuration which is mentioned in the above patch name for reference.

4) Obtain the Team Foundation URL or repository URL where all the scripts are stored along with the release folder path where all the patch files would be versioned and stored in the repository server 114*b*.

5) Obtain the first database 110 connection string or replica database where all the patch scripts would be executed in the sequence 6) Obtain Email identification (ID) to whom the patch files would be sent and whether email notification is required or not.

Once the user has provided the set of parameters, the database deployment module 108 configures the set of parameters in the second database 112. Once the above configuration is done, then the application indicated by the user is added in the list and is displayed in the database deployment module 108. Once the above set of parameters is configured, the application starts displaying in the list for the respective release year and period. Then, the user selects an application among a plurality of applications stored in the repository server 114*b*. After selecting the application, the user requests to retrieve plurality of scripts associated with the application. The user may request to retrieve the plurality of scripts developed by him or all the plurality of scripts developed by him and other users. Accordingly, the database deployment module 108 retrieves the plurality of scripts requested by the user from the repository server 114*b*. In an embodiment, the database deployment module 108 also retrieves the repository URL from where the scripts need to be picked from along with all the list of scripts which are required for the release. Based on the retrieved plurality of scripts, the user further selects at least one among the plurality of scripts for which he/she wants to create at least one patch file. Also, the users may select the at least one among the plurality of scripts for the application in the specified sequence. When the user has selected the at least one among the plurality of scripts, the creation of the at least one patch file is initiated by merging the at least one among the plurality of scripts. Before merging the at least one among the plurality of scripts, the database deployment module 108 may trigger the user to provide at least one comment/suggestion (or any similar input) on each of the at least one among the plurality of scripts. The at least one comment/suggestion (or any similar input) provided by the user are saved and are used for tracking the changes to the each of the at least one among the plurality of scripts. Upon merging the at least one among the plurality of scripts, the at least one among the plurality of scripts are validated by executing the at least one among the plurality of scripts in the first database 110. The at least one among the plurality of scripts are validated in the specified sequence defined by the user. Alternatively, the specified sequence may be defined by the database deployment module 108 based on the deployment of the application scripts which are related to database resources.

During the process of validation, the database deployment module 108 determines whether the at least one among the plurality of scripts is validated successfully in the first database 110. The database deployment module 108 creates the at least one patch file comprising the at least one among the plurality of scripts when the at least one among the plurality of scripts is validated successfully in the first database 110.

According to an alternate embodiment described herein, the database deployment module 108 may trigger a message (or a request) to the user to provide at least one comment on the at least one patch file, if the user has not provided the at least one comment on the each of the at least one among the plurality of scripts during merging. As described earlier, the at least one comment provided by the user are saved and are used for tracking the changes to the each of the at least one among the plurality of scripts. Upon receiving the at least one comment from the user, the unique label is assigned to the each of the at least one among the plurality of scripts comprised in the at least one patch file. Further, the database deployment module 108 creates the at least one patch file comprising the at least one of the plurality of scripts and the at least one comment based on the assigned unique label.

Upon creating the at least one patch file, the database deployment module 108 automatically stores the at least one patch file in the repository server 114*b*. Alternatively, the database deployment module 108 automatically stores the at least one patch file along with the at least one comment provided by the user in the repository server 114*b*. Further, the database deployment module 108 automatically versions the at least one among the plurality of scripts comprised in the at least one patch file in the repository server 114*b*. After versioning the at least one among the plurality of scripts comprised in the at least one patch file, the database deployment module 108 stores a copy of the versioned at least one among the plurality of scripts comprised in the at least one patch file in a common memory (not shown in FIG. 1). For example, the common memory corresponds to a shared path accessible to all the plurality of authorized users for the application. Alternatively, the terms "shared path" and "common memory" and "memory" are used interchangeably throughout the present disclosure. Later, the database deployment module 108 sends the notification message to the plurality of authorized users through the communication medium, where the notification message includes the common memory accessible to the plurality of authorized users, the validation information associated with the plurality of scripts, the specific sequence of execution of the plurality of scripts, the release month and the release year. The validation information associated with the plurality of scripts corresponds to the validation results of the at least one among the plurality of scripts.

Alternatively, when the validation of at least one among the plurality of scripts has failed, then the database deployment module 108 identifies the plurality of syntax error associated with each of the at least one among the plurality of scripts and displays the syntax error associated with each of the at least one among the plurality of scripts on the user interface 116. Further, the database deployment module 108 sends the notification message to the plurality of authorized users through the communication medium, where the notification message includes the validation failure message. In an embodiment of the present disclosure, the database deployment module 108 rectifies the identified syntax error by determining the statements of the scripts and analyzing the purpose of the statements. Alternatively, the database deployment module 108 may provide suggestions to the user indicating the correct syntax of the plurality of scripts.

According to an embodiment described herein, the database deployment module 108 generates the log file comprising the detailed steps for execution of the plurality of scripts along with the specific sequence, the script file identifier and the at least one resource file. For example, the log file may correspond to a read-me file. Further, the database deployment module 108 automatically stores the at least one patch file along with the log file in the repository server 114b upon generating the log file.

The diagram of FIG. 1 illustrates functional components of the computer implemented system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Figure 2:
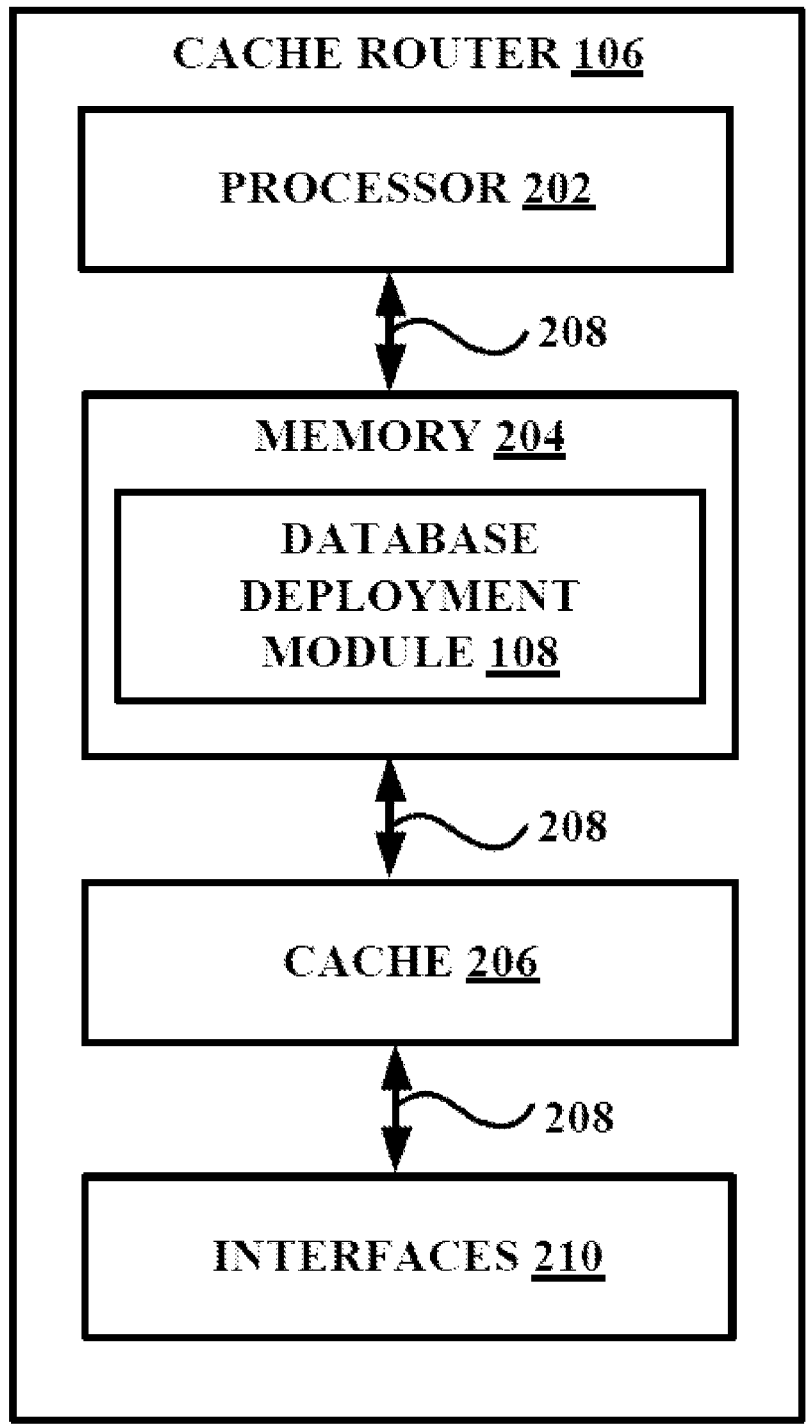
FIG. 2 illustrates a block diagram of an exemplary cache router, such as those shown in FIG. 1, showing various components for implementing embodiments of the present disclosure.

FIG. 2 illustrates a block diagram of an exemplary cache router 106, such as those shown in FIG. 1, showing various components for implementing embodiments of the present disclosure. According to FIG. 2, the cache router 106 includes a processor 202, a memory 204, a cache 206 (i.e., cache memory) and interface(s) 210. The memory 204 includes the database deployment module 108. The processor 202, the memory 204, the cache 206 and the interface(s) 210 may be communicatively coupled by a system bus such as a system bus 208 or a similar mechanism.

The processor 202 may be configured to implement functionality and/or process instructions for execution within the cache router 106. The processor 202 may be capable of processing instructions stored in the memory 204 or instructions stored on the cache 206. The processor 202 may include any one or more of a processor, a controller, a digital signal processor (DSP), an application specific integrated circuit (ASIC), a field-programmable gate array (FPGA), or equivalent discrete or integrated logic circuitry. Additionally, the functions attributed to the processor 202, in this disclosure, may be embodied as software, firmware, hardware or any combination thereof.

The processor 202 as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, or any other type of processing circuit. The processor 202 may also include embedded controllers, such as generic or programmable logic devices or arrays, application specific integrated circuits, single-chip computers, smart cards, and the like.

The memory 204 may be configured to store information within the cache router 106 during operation. The memory 204 may, in some examples, be described as a computer-readable storage medium. The memory 204 may be described as a volatile memory, meaning that the memory does not maintain stored contents when the computer is turned off. Examples of volatile memories include random access memories (RAM), dynamic random access memories (DRAM), static random access memories (SRAM), and other forms of volatile memories known in the art. In some examples, the memory 204 may be used to store program instructions for execution by processor 202. For example, the memory 204 includes a database deployment module 108 stored in the form of program instructions for execution by the processor 202. The database deployment module 108 can be implemented as software, hardware, or some combination of software and hardware. For example, the database deployment module 108 could be implemented as a part of an application specific integrated circuit (ASIC). The database deployment module 108 includes routines, programs, objects, components, data structures, etc., which perform particular tasks or implement particular abstract data types.

In some embodiments, the database deployment module 108 causes the processor 202 to validate the plurality of scripts associated with the application stored in the repository server 114b by executing the plurality of scripts in the first database 110. Thus, the direct interaction of the plurality of users with the first database 110 is avoided, thereby allowing the plurality of users to access only the plurality of scripts created by him/her through the database deployment platform and not complete database objects. This ensures the isolation of the first database 110 from the plurality of users and thus the first database 110 is more secure. Further, since the plurality of scripts are executed automatically in the first database 110, the plurality of users need not switch between one or more version controls for any changes with respect to the database objects.

The database deployment module 108 further causes the processor 202 to create at least one patch file comprising at least one of the plurality of scripts upon successful validation of the plurality of scripts associated with the application. Furthermore, the database deployment module 108 causes the processor 202 to automatically store the at least one patch file in the repository server 114b, where the at least one of the plurality of scripts comprised in the at least one patch file are automatically versioned in the repository server 114b.

According to an embodiment described herein, the database deployment module 108 causes the processor 202 to store the plurality of scripts comprised in the at least one patch file in the memory 204 upon successful validation of the plurality of scripts. The memory 204 corresponds to the shared path accessible by the plurality of users at a time. For example, the memory 204 corresponds to the shared path through which a plurality of authorized users can access the versioned patch files for the application. Additionally, the database deployment module 108 causes the processor 202 to send the notification message to the plurality of authorized users through a communication medium, where the notification message includes at least one of the memory 204 accessible to the plurality of authorized users, validation information associated with the plurality of scripts, a list of the plurality of scripts, a specific sequence of execution of the plurality of scripts, release month and release year. The communication medium can include, but not limited to, an electronic mail (e-mail), and a text message. The plurality of authorized users corresponds to the users who are authorized by a central agency in the database deployment platform. In an embodiment, the central agency may include the repository server 114b, such as a Team Foundation Server and the Active directory 114a, which provides capabilities to provide access to specific user groups for the script and release folder which are configured in database deployment platform-dashboard for accessing the database deployment platform. The access is granted by the repository server 114b, such as the Team Foundation Servers or administrator and thus it is a controller environment allowing specific user's access. The central agency monitors and manages the operations of the database management platform. For example, the central agency provides a security key for each user registering with the database deployment platform. The plurality of authorized users access the database deployment platform and features facilitated at the database deployment platform once the security key is received.

According to an embodiment described herein, the database deployment module 108 causes the processor 202 to retrieve the plurality of scripts associated with the application from the repository server 114b based on a user selection, and merge the plurality of scripts associated with the application to create the at least one patch file. Further, the database deployment module 108 causes the processor 202 to authenticate the user using the repository server 114b based on the user credentials, where the user credentials are inputted by the user on the user interface 116. Additionally, the database deployment module 108 causes the processor 202 to configure the set of parameters corresponding to the application in the second database 112 based on the authentication, where the set of parameters includes at least one of the release configuration, the name of the first database 110, the connection string, the email identification (ID) of the user and the application identifier.

According to an embodiment described herein, the database deployment module 108 causes the processor 202 to identify the plurality of syntax errors associated with the plurality of scripts during the execution of the plurality of scripts in the first database 110, and display the plurality of syntax errors associated with the plurality of scripts along with the validation failure message on the user interface 116. Specifically, the database deployment module 108 provides detailed error(s) with respect to the plurality of syntax error such that the plurality of scripts with incorrect syntax are restricted to be deployed in a release cycle. In an embodiment of the present disclosure, the database deployment module 108 rectifies the identified syntax error by determining the statements of the scripts and analyzing the purpose of the statements. Further, the database deployment module 108 causes the processor 202 to send the notification message to the plurality of authorized users through the communication medium, where the notification message includes the validation failure message.

According to an embodiment described herein, the database deployment module 108 causes the processor 202 to obtain at least one comment/suggestions (or any similar input) on the at least one patch file from the user, assign a unique label to each of the plurality of scripts comprised in the at least one patch file based on the at least one comment, create the at least one patch file comprising the at least one of the plurality of scripts and the at least one comment based on the assigned unique label, and automatically store the at least one patch file along with the at least one comment provided by the user in the repository server 114b. The labels (for example, tagging of database structure snapshots and relevant content) before and after deployment of changes, act as a safety-net, in order to ensure quick and easy roll-backs.

According to another embodiment described herein, the database deployment module 108 causes the processor 202 to generate a log file comprising detailed steps for execution of the plurality of scripts along with the specific sequence, a script file identifier and at least one resource file, and automatically store the at least one patch file along with the log file in the repository server 114b. Some examples of resource file are provided in Annexure A. The script identifiers are patch names generated by the database deployment module 108 based on user selection of application. For example, script identifier for trading application may be, Trading_October_2015_1.Sql and the like.

According to an embodiment described herein, the database deployment module 108 causes the processor 202 to create a guidebook for each application stored in the repository server 114b, where the guidebook includes the log file, and periodically update the guidebook in the repository server 114b and in the memory 204 when the user modifies a patch file associated with the each application. The guidebook, also referred herein as a manual, comprising a set of guidelines generated for the each application which provides readable, clear and detailed steps for executing the plurality of scripts in the first database 110 along with the resource file to the plurality of authorized users during release phase.

The cache 206 is configured for temporarily storing the plurality of scripts associated with the application, a memory connection between the cache 206 and at least one of plurality of first memory locations, second memory locations, wherein the connection enables the retrieval of plurality of scripts associated with the application stored in the repository server 114b. The cache 206 may also store the information relating to the configuration of the application. The cache 206 may serve as a fast access memory. The cache 206 typically stores the plurality of scripts for a configurable period of time.

The functionalities of the bus 208 are well known to a person skilled in the art and hence the explanation thereof is omitted.

The interface(s) 210 may include a variety of software and hardware interfaces, for example, interfaces for peripheral device(s), such as a keyboard, a mouse, an external memory, and a printer. The interface(s) 210 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 210 may include one or more ports for connecting the cache router 106 to one or more of user devices and data sources (not shown).

The cache router 106 may include additional components not shown in FIG. 2 for purposes of clarity. For example, the cache router 106 may also include a network interface, in examples where the cache router 106 is capable of communicating with other communication networks. The cache router 106 may also include an internal bus, communication connections, and one or more input/output devices.

Figure 3:
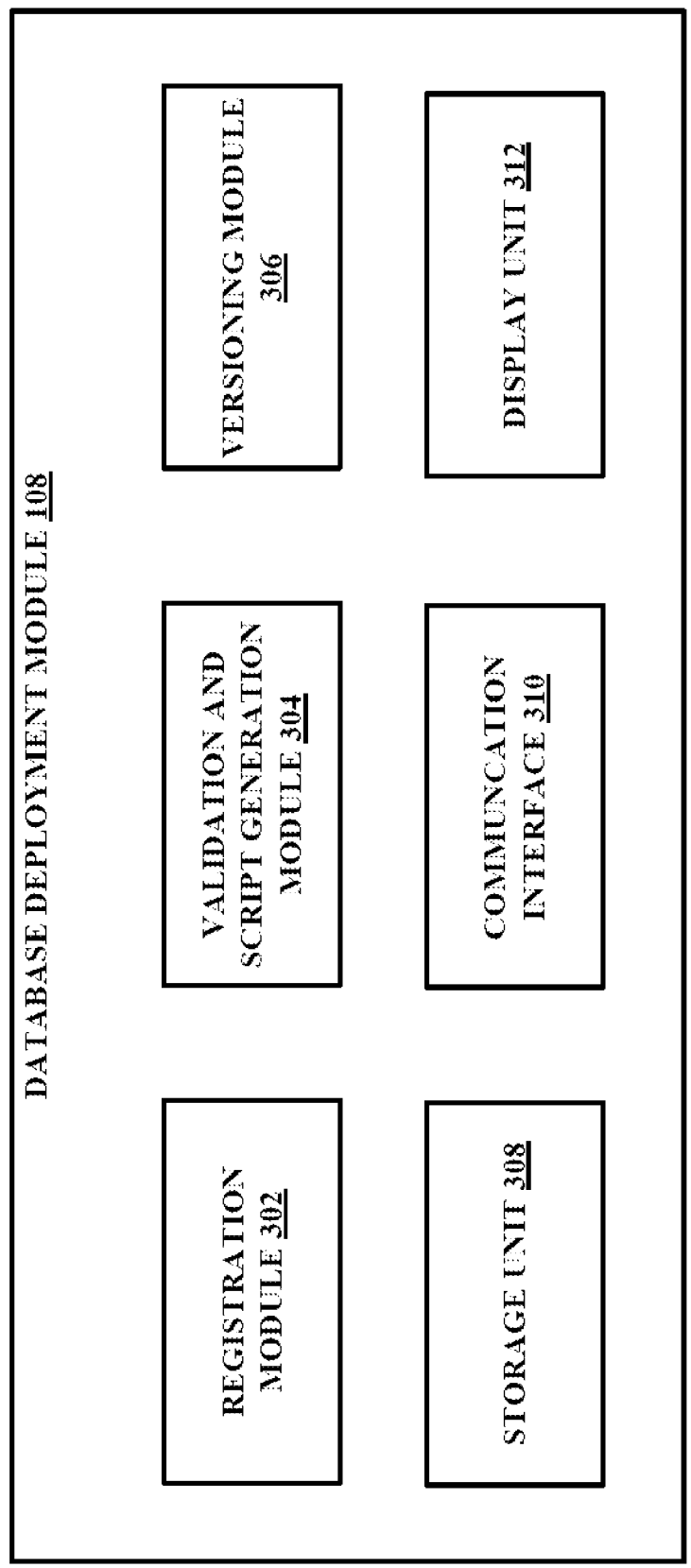
FIG. 3 illustrates a detailed view of a database deployment module such as those shown in FIG. 1 and FIG. 2, showing various functional components for implementing embodiments of the present disclosure.

FIG. 3 illustrates a detailed view of the database deployment module 108 such as those shown in FIG. 1 and FIG. 2, showing various functional components for implementing embodiments of the present disclosure. According to FIG. 3, the database deployment module 108 includes a registration module 302, a validation and script generation module 304, a versioning module 306, a storage unit 308, a communication interface 310, and a display unit 312.

The registration module 302 is configured for registering the user in the database deployment platform by obtaining the user credentials from the user. The user credentials are then stored in the repository server 114b for authentication when the user tries to log in to the database deployment platform. The registration module 302 further includes authenticating the user for providing access to the database deployment platform based on the user credentials stored in the repository server 114b. Upon successful authentication of the user, the registration module 302 provides a set of dialog boxes on the user interface 116 of the client device 102, enabling the user to input the set of parameters required for configuration of the application. Once the set of parameters are obtained from the user, the registration module 302 configures the set of parameters associated with the application in the second database 112. The set of parameters includes at least one of the release configuration, the name of the first database 110, the connection string, the email ID of the user and the application identifier. Once the set of parameters are configured in the second database 112, the registration module 302 sends an OK command to the validation and script generation module 304 for proceeding further with the deployment of the application.

The validation and script generation module 304 is configured for receiving the OK command sent by the registration module 302, and thereby initiating the further process of deployment. The validation and script generation module 304 is configured for retrieving the plurality of scripts associated with the application from the repository server 114b based on the user selection. In an embodiment, the validation and script generation module 304 retrieves all scripts corresponding to the application stored in the repository server 114b. In such a scenario, the scripts developed by the user and other users for a particular application are retrieved.

For example, a user A chooses to deploy a bank transaction application in an environment. The user A would have previously developed and stored the plurality of scripts associated with the bank transaction application in the repository server 114b. Similarly, a user B would have also developed and stored a plurality of scripts for the same application in the repository server 114b. When the user A has logged into the database deployment platform and is in the process of deploying the bank transaction application, the validation and script generation module 304 enables the user A to either retrieve the plurality of scripts developed by him associated with that particular application or to retrieve all the plurality of scripts, both which are developed by the user A and the user B.

Based on the retrieved plurality of scripts, the validation and script generation module 304 enables the user to select at least one among the retrieved plurality of scripts for deployment and versioning. Upon obtaining the user selection comprising the plurality of scripts, the validation and script generation module 306 is configured for merging the plurality of scripts associated with the application to create the at least one patch file. In an embodiment, the validation and script generation module 304 merges the plurality of scripts in the specific sequence so as to ensure efficient deployment of the application. In an embodiment, the user can provide at least one comment on each of the plurality of scripts prior to merging of the plurality of scripts. These at least one comments are embedded in the respective each of the plurality of scripts in order to track the changes made to the each of the plurality of scripts. Further, the validation and script generation module 304 is configured for validating the plurality of scripts associated with the application stored in the repository server 114b by executing the plurality of scripts in the first database 110. The validation and script generation module 304 validates the plurality of scripts based on the specified sequence defined by the user during the merging process. Further, the validation and script generation module 304 is configured for identifying the plurality of syntax errors associated with the plurality of scripts during the execution of the plurality of scripts in the first database 110. While executing the plurality of scripts at the first database 110, the validation and script generation module 304 analyzes the structure of each of the plurality of scripts and determines whether the plurality of scripts are validated successfully. In an embodiment, if the validation and script generation module 304 determines that the validation of the plurality of scripts has succeeded, then the validation and script generation module 304 creates the at least one patch file comprising the at least one of the plurality of scripts upon successful validation of the plurality of scripts associated with the application.

Further, the validation and script generation module 304 is configured for obtaining the at least one comment on the at least one patch file from the user, where the at least one comment are provided by the user during the merging process. Furthermore, the validation and script generation module 304 is configured for assigning the unique label to the each of the plurality of scripts comprised in the at least one patch file based on the at least one comment. Moreover, the validation and script generation module 304 is configured for creating the at least one patch file comprising the at least one of the plurality of scripts and the at least one comment based on the assigned unique label.

For example, the user has selected five scripts for deploying and versioning. Further, the user may have selected the five scripts in the specified sequence for execution. The user may then choose to add specific comments to each of the five scripts. The validation and script generation module 304 merges these five scripts selected by the user in the specified sequence to create a patch file comprising these five scripts. Further, the validation and script generation module 304 may then validate each of the five scripts by executing the five scripts in the sequence specified by the user in the first database 110. Considering that the validation of the five scripts were successful, then the validation and script generation module 304 assigns the unique label, such as an "version 2" or "edited" and the like to each of the five scripts and creates the at least patch file comprising the five scripts along with the specific comments added by the user.

According to an embodiment described herein, if the validation and script generation module 304 determines that the validation of the plurality of scripts has failed, then the validation and script generation module 304 identifies the syntax error associated with the plurality of scripts. Unlike the conventional systems, which fail to identify the syntax issues of the plurality of scripts and hence skips the validation process itself, the validation and script generation module 304 of the present disclosure identifies the syntax issues during the execution of the plurality of scripts in the first database 110 and displays the identified plurality of syntax errors associated with the plurality of scripts along with the validation failure message on the user interface 116. Hence, the user is well aware of the errors generated for his scripts. In an embodiment, the validation and script generation module 304 automatically fix the syntax errors of the plurality of scripts by analyzing the structure of the plurality of scripts, determining the purpose of the script statement and autocorrecting the syntax of the plurality of scripts based on the determination. Later, the validation and script generation module 304 then feeds the created at least one patch file along with the at least one comment provided by the user to the versioning module 306. Further, the validation and script generation module 304 also feeds in the validation results to the versioning module 306.

The versioning module 306 is configured for automatically versioning the plurality of scripts comprised in the at least one patch file in the repository server 114b. Further, the versioning module 306 is configured for generating the log file comprising the detailed steps for execution of the plurality of scripts along with the specified sequence, the script file identifier and the at least one resource file. Furthermore, the versioning module 306 is configured for creating the guidebook for the each application stored in the repository server 114b, wherein the guidebook includes the log file. Additionally, the versioning module 306 is configured for periodically updating the guidebook in the repository server 114b and in the memory 204 when the user modifies the patch file associated with the each application and thus maintains the guidebook with the latest versions to the plurality of scripts thereby helping the users during the release phase. The guidebooks are maintained for the each application stored in the repository server 114b. The guidebooks are generated based on the configuration of the each application. The generated guidebooks are also stored in the repository server 114b and the memory 204 accessible to the plurality of authorized users.

The storage unit 308 may include one or more computer-readable storage media. The storage unit 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 308 may, in some examples, be considered a non-transitory storage medium. The term "non-transitory" may indicate that the storage medium is not embodied in a carrier wave or a propagated signal. However, the term "non-transitory" should not be interpreted to mean that the storage unit 308 is non-movable. In some examples, the storage unit 308 may be configured to store larger amounts of information than the memory. In certain examples, a non-transitory storage medium may store data that can, over time, change (e.g., in Random Access Memory (RAM) or cache). Further, the storage unit 308 is configured for automatically storing the plurality of scripts in the repository server 114b. Further, the storage unit 308 is configured for automatically storing the at least one patch file along with at least one comment provided by the user in the repository server 114b. Moreover, the storage unit 308 is configured for automatically storing the at least one patch file along with the log file in the repository server 114b. Furthermore, the storage unit 308 is configured for storing temporary variables generated during the execution of the plurality of scripts.

The communication interface 310 is configured for sending the notification message to the plurality of authorized users through the communication medium, where the notification message includes at least one of the memory 204 accessible to the plurality of authorized users, the validation information associated with the plurality of scripts, the list of the plurality of scripts, the specific sequence of execution of the plurality of scripts, the release month and the release year. Further, the communication interface 310 is configured for sending the notification message to the plurality of authorized users through the communication medium, where the notification message includes the validation failure message. The communication interface 310 also enables communication between various functional components within the cache router 106 and also between the cache router 106 and other entities on the computer implemented system 100 as shown in FIG. 1.

The display unit 312 is configured for displaying the plurality of syntax errors associated with the plurality of scripts along with the validation failure message. Also, the display unit 312 is configured for displaying a validation success message on the user interface 116 of the client system 102. Further, the display unit 312 is configured for displaying various dialog boxes for providing the set of parameters required for configuring the application in the second database 112. For example, the display unit 312 displays various fields such as "select main database", "select patch prefix name", "select release year", and "select release month". However, it is to be understood by a person skilled in the art that the display unit 312 is not limited to display the elements mentioned above and thus may include other elements known in the art.

Further, the display unit 312 is also configured for providing a set of dialog boxes indicating the user to fill in his/her log in credentials during the authentication process. Furthermore, the display unit 312 is configured for displaying a plurality of process related notifications during the deployment process. For example, the process related notifications corresponds to suggestions to the syntax of the plurality of scripts, description for a particular script word, and the like.

The registration module 302, the validation and script generation module 304, the versioning module 306, are implemented as a logically self-contained part of a software program that when executed perform the above method described herein, in one embodiment.

According to another embodiment described herein, registration module 302, the validation and script generation module 304, the versioning module 306, are implemented as a self-contained hardware component. In yet another embodiment, the above modules may be implemented as a self-contained hardware component, with a logically self-contained part of a software program embedded into each of the hardware component.

Figure 4:
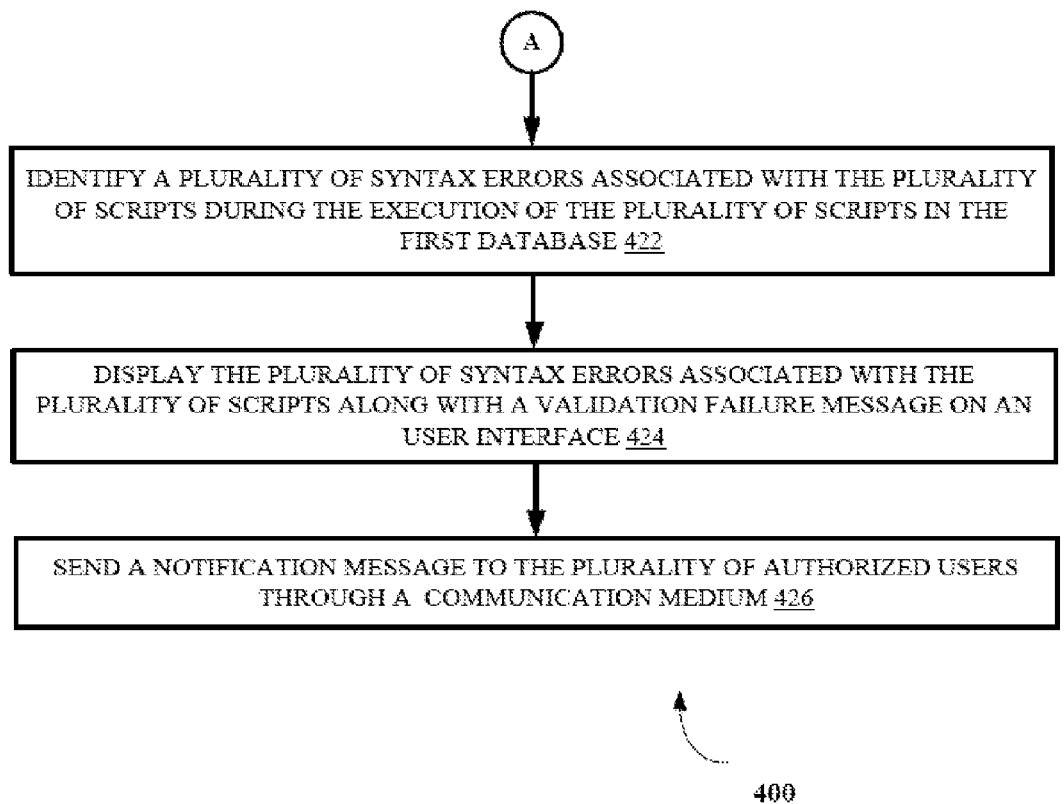
FIG. 4 is a flowchart illustrating an exemplary method for automatically deploying and versioning the scripts, according to an embodiment of the present disclosure.
Figure 4:
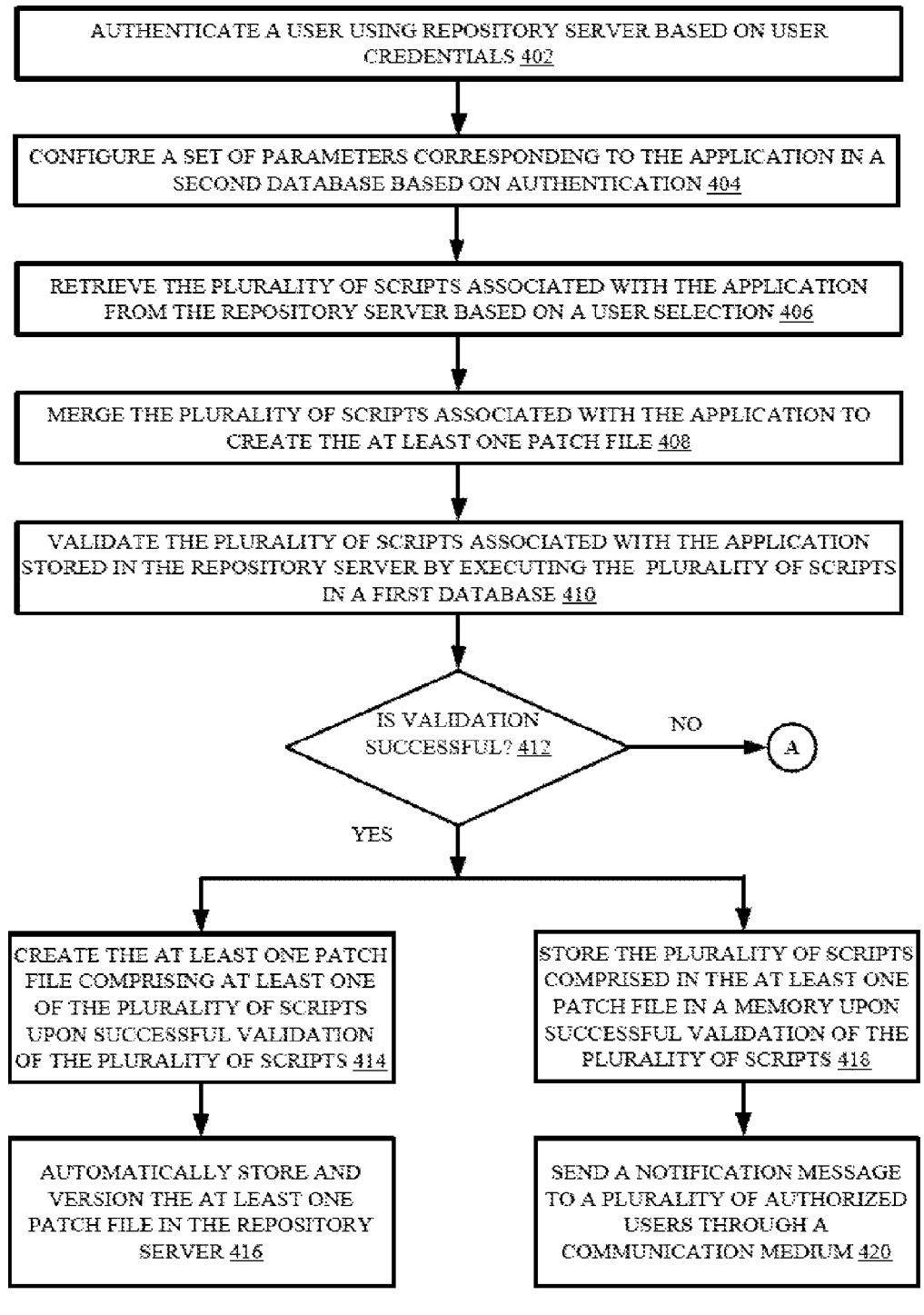

FIG. 4 is a flowchart illustrating an exemplary method 400 for automatically deploying and versioning scripts, according to the embodiment of the present disclosure. At step 402, the user is authenticated using the information stored in the repository server 114b based on the user credentials. For example, the user credentials inputted by the user are mapped with the information stored in the repository server 114b for authenticating the user. At step 404, the set of parameters corresponding to the application are configured in the second database 112 if the user is successfully authenticated. The set of parameters include, but not limited to, the at least one of release configuration, the name of the first database 110, the connection string, the email identification (ID) of the user and the application identifier. Upon configuring the set of parameters, the database deployment module 108 enables the user selects the application from the plurality of application in the repository server 114b for deployment. Upon selecting the application, the database deployment module 108 enables the user retrieves all the plurality of scripts associated with that application. In an embodiment, the user retrieves the plurality of scripts developed by him for the application. Alternatively, the user may also retrieve the plurality of scripts developed by him as well as the other users for the same application. Further, the user selects a plurality of scripts among the retrieved plurality of scripts for deployment.

At step 406, the plurality of scripts associated with the application are retrieved from the repository server 114b based on the user selection. At step 408, the plurality of scripts associated with the application are merged to create the at least one patch file. When the plurality of scripts associated with the application are merged, the database deployment module 108 initiates the creation of the at least one patch file. At step 410, the plurality of scripts associated with the application stored in the repository server 114b are validated by executing the plurality of scripts in the first database 110. At step 412, it is determined whether the plurality of scripts are validated successfully. When the plurality of scripts are validated successfully, then two process are carried out in parallel. At step 414, the at least one patch file comprising the at least one of the plurality of scripts are created upon successful validation of the plurality of scripts. At step 416, the at least one patch file comprising the at least one of the plurality of scripts are automatically stored in the repository server 114b and are automatically versioned in the repository server 114b. In parallel to the steps 414 and 416, the plurality of scripts comprised in the at least one patch file are stored in the memory 204 of the cache router 106 upon successful validation of the plurality of scripts. At step 420, the notification message is sent to the plurality of authorized users through the communication medium. The notification message includes at least one of the memory 204 accessible to the plurality of authorized users, the validation information associated with the plurality of scripts, the list of the plurality of scripts, the specific sequence of execution of the plurality of scripts, the release month and the release year. Further, the communication medium may include, but not limited to, email, text message and voice message.

According to another embodiment described herein, when the validation of the plurality of scripts fails, then at step 422, the plurality of syntax errors associated with the plurality of scripts are identified during the execution of the scripts in the first database 110. At step 424, the plurality of syntax errors associated with the plurality of scripts are displayed along with the validation failure message on the user interface 116. At step 426, the notification message indicating the validation result is sent to the plurality of authorized users through the communication medium.

According to an embodiment described herein, the at least one comment on the at least one patch file is obtained from the user once the patch file is validated and executed in the first database 110 and is stored into the repository server 114b. The comments with respect to patch files are available in the repository server 114b to users for view purpose. Further, the unique label is assigned to each of the plurality of scripts comprised in the at least one patch file based on the at least one comment. Furthermore, the at least one patch file comprising the at least one of the plurality of scripts and the at least one comment is created based on the assigned unique label. Moreover, the at least one patch file along with the at least one comment provided by the user are automatically stored in the repository server 114b.

According to an embodiment described herein, the log file comprising detailed steps for execution of the plurality of scripts along with the specific sequence, the script file identifier and the at least one resource file are generated by the database deployment module 108. Further, the at least one patch file along with the log file are automatically stored in the repository server 114b. Examples of log file may include, as below:
Author: XXX
Database: Trading
Description: Below scripts are for trading application which involves stock market stickers and daily data watch/
Environment: Prod
For any script issues or queries please contact xxxemail@yyy.com According to an embodiment described herein, the guidebook for each application stored in the repository server 114b is created where the guidebook includes the log file. Further, the guidebook is periodically updated in the repository server 114b and in the memory 204 when the user modifies the patch file associated with the each application.

The method 400 can be implemented in any suitable hardware, software, firmware, or combination thereof.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of automatically deploying and versioning scripts without requiring manual efforts. The embodiment thus provides a database deployment platform which automates the process of validation, deployment and versioning of the plurality of scripts which the user requires for deploying an application in various scenarios. Further, the embodiments herein provide reliable deployment of scripts, which are capable of dealing with conflicts and merges of database code, and cross updates from other teams, while also ignoring wrong code overrides, and are fully integrated into the version control repository by maintaining scripts in repository server 114b, the memory 204 and the email ID of the user. Moreover, the embodiments herein further provide automated versioning of the plurality of scripts which ensures that multiple databases are in the same state when generating deployment scripts.

Further, the embodiments herein provide the tracking mechanism to track the patch files individually by updating the comments provided by the user. Further, the embodiments herein provide the interactive user interface 116 to manage the list of scripts, and to configure all the scripts configuration along with the database connection string and the email configuration efficiently. Also, since the plurality of scripts are automatically stored along with the updated comments provided by the user in the repository server 114b, the computer implemented system provides agile short iterations, agile team collaboration and agile version control.

According to an embodiment described herein, the database deployment platform is suitable for any kind of deployment environment which follows the same structuring process as described herein. Thus, the database deployment platform ensures configuration management & consistency such that every development environment, branch, trunk, sand-box, and testing or production environment follows the same structure, and matching status; or any deviation and difference are well accounted for. Also, the users can confidently re-run this script to deploy to subsequent environments.

Furthermore, the database deployment platform enables task based deployments, partial deployments, and last minute scope changes to be coordinated between code and the database. Further, the embodiments herein provide a general guideline for the each application stored in the repository server 114b which is generated automatically that provides readable and clear steps for database administrators' during the release phase. Hence, the users can manage and track the sequence of steps through the log file, which provides easy steps for the database administrators to execute the scripts.

Moreover, the embodiments herein provide an automated process of validating the plurality of scripts by executing the plurality of scripts in the first database 110 which is a replica database of the main database. Also, the embodiments herein provide notification mechanisms for alerting the plurality of authorized users regarding the validation results, versioning, the common memory and the like.

Furthermore, the embodiments herein ensures only authorized users are making change to the scripts as the database deployment platform involves authentication of each user logging in.

Due to the automated process described in the embodiments herein, deployment costs are reduced by a significant number.

Furthermore, the embodiments herein provide the users to test the plurality of scripts in a representative pre-production environment, and utilize impact analysis with three-way comparison. The database deployment platform executes all the selected scripts in particular sequence which user selected into first database 110 which is replica database of the original production database when the application users or DBA's have selected the scripts for respective production release. This first database 110 is configured initially by users at first time through the configuration dashboard which is available in the database deployment platform. Hence, once the scripts are executed in the first database 110, the database deployment platform checks for security policy, company policies and sql script compliances with respect to industry standards. Thus, the database deployment platform allows the users to do unit test their scripts, secondly comply with industry standards and company policy and provide optimization suggestions by comparing the scripts. If there is any failure in the script execution, the database deployment platform notifies the users in the UI interface 116, thus avoiding any error prone scripts to go in production and further revalidates the scripts as well. The above process is executed in following sequence, at first application user or the DBA configures the first database 110 through the database deployment platform-configuration dashboard. Then, the database deployment platform applications selects specific release scripts and do a bulk script execution in a sequence thus validating the scripts based on the production schema.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

ANNEXURE A

1. Following are some examples of SQL script files:
   In one example, scripts for creating practice database with following SQL columns are described below:

Example 1

```
USE [Test Database]
CREATE TABLE practice
(
    fname    VARCHAR(20)   NOT NULL,
    lname    VARCHAR(30)   NOT NULL,
    hire_date SMALLDATETIME NULL,
    ssn      CHAR(11)      NOT NULL
)
GO
```

In another example, script for merge query to merge Book Inventory tables based on condition matched is described below:

Example 2

```
MERGE BookInventory bi
USING BookOrder bo
ON bi.TitleID = bo.TitleID
WHEN MATCHED AND
    bi.Quantity + bo.Quantity = 0 THEN
    DELETE
WHEN MATCHED THEN
    UPDATE
    SET bi.Quantity = bi.Quantity + bo.Quantity
WHEN NOT MATCHED BY TARGET THEN
    INSERT (TitleID, Title, Quantity)
    VALUES (bo.TitleID, bo.Title,bo.Quantity);
```

In an embodiment, examples of SQL Scripts includes a procedure with an input and an output parameter. In example 3, described below, @SalesPerson parameter would receive an input value specified by a calling program. A SELECT statement uses a value passed into the input parameter to obtain the correct SalesYTD value. The SELECT statement also assigns the value to the @SalesYTD output parameter, which returns the value to the calling program when the procedure exits.

Example 3

```
USE AdventureWorks2012;
GO
IF OBJECT_ID('Sales.uspGetEmployeeSalesYTD', 'P') IS NOT NULL
    DROP PROCEDURE Sales.uspGetEmployeeSalesYTD;
GO
CREATE PROCEDURE Sales.uspGetEmployeeSalesYTD
@SalesPerson nvarchar(50),
@SalesYTD money OUTPUT
AS
    SET NOCOUNT ON;
    SELECT @SalesYTD = SalesYTD
    FROM Sales.SalesPerson AS sp
    JOIN HumanResources.vEmployee AS e ON
e.BusinessEntityID = sp.BusinessEntityID
    WHERE LastName = @SalesPerson;
RETURN
GO
```

Furthermore, in the above example 3, the procedure created in the first example is called and the output value returned from the called procedure is saved in the @SalesYTD variable, which is local to the calling program.

2. Below is an example of patch files and/or resource files generated from the database deployment platform, according to an exemplary embodiment:

```
--Script Header Start
Use [Trading]
Go
SET NOEXEC OFF
Declare @res int
Exec @res=dbo.spBeginScript_Trading_October_2015_1
If @res =−1
BEGIN
SET NOEXEC ON
END
GO
--Script Header END
USE [Trading]
MERGE INTO bonuses B
USING (
    SELECT employee_id, salary
    FROM employee
    WHERE dept_no =20) E
ON (B.employee_id = E.employee_id)
WHEN MATCHED THEN
    UPDATE SET B.bonus = E.salary * 0.1
WHEN NOT MATCHED THEN
    INSERT (B.employee_id, B.bonus)
    VALUES (E.employee_id, E.salary * 0.05);
USE [Trading]
GO
CREATE PROCEDURE HumanResources.uspGetEmployeesTest2
    @LastName nvarchar(50),
    @FirstName nvarchar(50)
AS
    SET NOCOUNT ON;
    SELECT FirstName, LastName, Department
    FROM HumanResources.vEmployeeDepartmentHistory
    WHERE FirstName = @FirstName AND LastName = @LastName
    AND EndDate IS NULL;
GO
Use [Trading]
CREATE PROCEDURE uspGetAddress @City nvarchar(30) = NULL
AS
SELECT *
FROM AdventureWorks.Person.Address
WHERE City = @City
GO
--- Script Trailer Start
EXEC dbp.spEndScript_Trading_October_2015_1 ,'Patch Implemented'
GO
Print 'Patch Trading_October_2015_1 Implemented Successfully '
Go
--Script Trailer End
```

I claim:

1. A computer implemented method for automatically deploying and versioning scripts, the method comprising:

validating a plurality of scripts associated with an application stored in a repository server by executing the plurality of scripts in a first database, wherein validating the plurality of scripts comprises:

retrieving the plurality of scripts associated with the application from the repository server based on at least one user selection, wherein the at least one user selection is used for tracking changes to each of the at least one among the plurality of scripts; and merging the plurality of scripts associated with the application in a specified sequence to create at least one patch file and providing a tracking mechanism to track the at least one patch file individually from the at least one user selection by updating at least one user comment;

creating the at least one patch file comprising at least one of the plurality of scripts upon successful validation of the plurality of scripts associated with the application; and automatically storing the at least one patch file in the repository server, wherein the at least one of the plurality of scripts comprised in the at least one patch file are automatically versioned in the repository server, and a copy of the version is stored in a shared path accessible by a plurality of users at a time.

2. The computer implemented method as claimed in claim 1, further comprising:
storing the plurality of scripts comprised in the at least one patch file in a memory upon successful validation of the plurality of scripts; and
sending a notification message to a plurality of authorized users through a communication medium, wherein the notification message comprises at least one of the memory accessible to the plurality of authorized users, validation information associated with the plurality of scripts, a specific sequence of execution of the plurality of scripts, release month and release year.

3. The computer implemented method as claimed in claim 1, wherein retrieving the plurality of scripts associated with the application from the repository server based on the user selection comprises:
authenticating a user using the repository server based on user credentials, wherein the user credentials are inputted by the user on an user interface; and
configuring a set of parameters corresponding to the application in a second database based on the authentication, wherein the set of parameters comprises at least one of release configuration, name of the first database, connection string, email ID of the user and an application identifier.

4. The computer implemented method as claimed in claim 1, wherein validating the plurality of scripts associated with the application stored in the repository server is based on a specific sequence.

5. The computer implemented method as claimed in claim 1, wherein validating the plurality of scripts associated with the application stored in the repository server by executing the plurality of scripts in the first database comprises:
identifying a plurality of syntax errors associated with the plurality of scripts during the execution of the plurality of scripts in the first database;
displaying the plurality of syntax errors associated with the plurality of scripts along with a validation failure message on an user interface; and
sending a notification message to a plurality of authorized users through a communication medium, wherein the notification message comprises validation failure message.

6. The computer implemented method as claimed in claim 1, wherein creating the at least one patch file comprising the at least one of the plurality of scripts upon successful validation of the plurality of scripts associated with the application comprises:
obtaining at least one comment on the at least one patch file from a user;
assigning a unique label to each of the plurality of scripts comprised in the at least one patch file based on the at least one comment; and
creating the at least one patch file comprising the at least one of the plurality of scripts and the at least one comment based on the assigned unique label.

7. The computer implemented method as claimed in claim 1, wherein automatically storing the at least one patch file in the repository server comprises:
automatically storing the at least one patch file along with at least one comment provided by a user in the repository server.

8. The computer implemented method as claimed in claim 1, wherein automatically storing the at least one patch file in the repository server comprises:
generating a log file comprising detailed steps for execution of the plurality of scripts along with a specific sequence, a script file identifier and at least one resource file; and
automatically storing the at least one patch file along with the log file in the repository server.

9. The computer implemented method as claimed in claim 1, further comprising:
creating a guidebook for each application stored in the repository server, wherein the guidebook comprises a log file; and
periodically updating the guidebook in the repository server and in a memory when a user modifies a patch file associated with the each application.

10. A computer implemented system for automatically deploying and versioning scripts, wherein the computer implemented system comprising:
a hardware processor; and
a memory coupled to the processor, wherein the memory comprises a set of instructions stored in the form of executable program which when executed by the processor, cause the processor to:
validate a plurality of scripts associated with an application stored in a repository server by executing the plurality of scripts in a first database, wherein validating the plurality of scripts comprises:
retrieve the plurality of scripts associated with the application from the repository server based on at least one user selection, wherein the at least one user selection tracks changes to each of the at least one among the plurality of scripts; and
merge the plurality of scripts associated with the application in a specified sequence to create at least one patch file and providing a tracking mechanism to track the at least one patch file individually from the at least one user selection by updating at least one user comment;
create the at least one patch file comprising at least one of the plurality of scripts upon successful validation of the plurality of scripts associated with the application; and
automatically store the at least one patch file in the repository server, wherein the at least one of the plurality of scripts comprised in the at least one patch file are automatically versioned in the repository server, and wherein a copy of the version is stored in a shared path accessible by a plurality of users at a time.

11. The computer implemented system as claimed in claim 10, wherein executable program which when executed by the processor, cause the processor to:
store the plurality of scripts comprised in the at least one patch file in a memory upon successful validation of the plurality of scripts; and
send a notification message to a plurality of authorized users through a communication medium, wherein the notification message comprises at least one of the memory accessible to the plurality of authorized users, validation information associated with the plurality of scripts, a specific sequence of execution of the plurality of scripts, release month and release year.

12. The computer implemented system as claimed in claim 10, wherein in retrieving the plurality of scripts associated with the application from the repository server based on the user selection, executable program which when executed by the processor, cause the processor to:
   authenticate a user using the repository server based on user credentials, wherein the user credentials are inputted by the user on an user interface; and
   configure a set of parameters corresponding to the application in a second database based on the authentication, wherein the set of parameters comprises at least one of release configuration, name of the first database, connection string, email ID of the user and an application identifier.

13. The computer implemented system as claimed in claim 10, wherein the executable program which when executed by the processor, cause the processor to:
   validate the plurality of scripts associated with the application stored in the repository server based on a specific sequence.

14. The computer implemented system as claimed in claim 10, wherein in validating the plurality of scripts associated with the application stored in the repository server by executing the plurality of scripts in the first database, the executable program which when executed by the processor, cause the processor to:
   identify a plurality of syntax errors associated with the plurality of scripts during the execution of the plurality of scripts in the first database;
   display the plurality of syntax errors associated with the plurality of scripts along with a validation failure message on an user interface; and
   send a notification message to a plurality of authorized users through a communication medium, wherein the notification message comprises validation failure message.

15. The computer implemented system as claimed in claim 10, wherein in creating the at least one patch file comprising the at least one of the plurality of scripts upon successful validation of the plurality of scripts associated with the application, the executable program which when executed by the processor, cause the processor to:
   obtain at least one comment on the at least one patch file from an user;
   assign a unique label to each of the plurality of scripts comprised in the at least one patch file based on the at least one comment; and
   create the at least one patch file comprising the at least one of the plurality of scripts and the at least one comment based on the assigned unique label.

16. The computer implemented system as claimed in claim 10, wherein in automatically storing the at least one patch file in the repository server, the executable program which when executed by the processor, cause the processor to:
   automatically store the at least one patch file along with at least one comment provided by a user in the repository server.

17. The computer implemented system as claimed in claim 10, wherein in automatically storing the at least one patch file in the repository server, the executable program which when executed by the processor, cause the processor to:
   generate log file comprising detailed steps for execution of the plurality of scripts along with a specific sequence, a script file identifier and at least one resource file; and
   automatically store the at least one patch file along with the log file in the repository server.

18. The computer implemented system as claimed in claim 10, wherein the executable program which when executed by the processor, cause the processor to:
   create a guidebook for each application stored in the repository server, wherein the guidebook comprises a log file; and
   periodically update the guidebook in the repository server and in a memory when an user modifies a patch file associated with the each application.

19. A non-transitory computer-readable storage medium having instructions stored therein that when executed by a hardware processor, cause the processor to perform method steps comprising:
   validating a plurality of scripts associated with an application stored in a repository server by executing the plurality of scripts in a first database, wherein validating the plurality of scripts comprises:
   retrieving the plurality of scripts associated with the application from the repository server based on at least one user selection, wherein the at least one user selection tracks changes to each of the at least one among the plurality of scripts; and
   merging the plurality of scripts associated with the application in a specified sequence to create at least one patch file and providing a tracking mechanism to track the at least one patch file individually from the at least one user selection by updating at least one user comment;
   creating the at least one patch file comprising at least one of the plurality of scripts upon successful validation of the plurality of scripts associated with the application; and
   automatically storing the at least one patch file in the repository server, wherein the at least one of the plurality of scripts comprised in the at least one patch file are automatically versioned in the repository server, and wherein a copy of the version is stored in a shared path accessible by a plurality of users at a time.

* * * * *